E. L. MAGLY.
SCALE ATTACHMENT FOR HAY PRESSES.
APPLICATION FILED MAY 8, 1919.
1,362,333.
Patented Dec. 14, 1920.
2 SHEETS—SHEET 1.
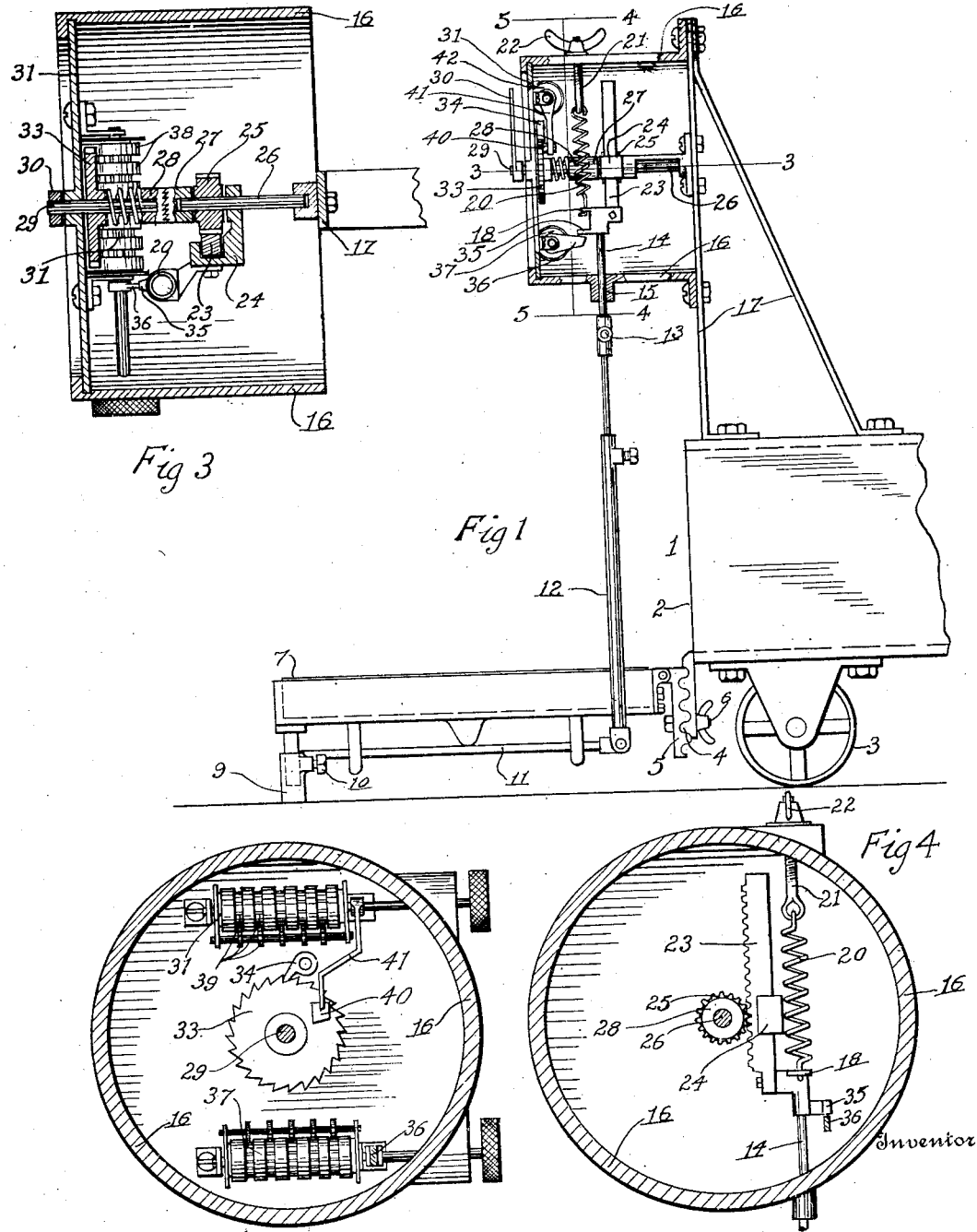
Elmer L Magly
O.C. Shepherd Attorney E. L. MAGLY.
SCALE ATTACHMENT FOR HAY PRESSES.
APPLICATION FILED MAY 8, 1919.
1,362,333.
Patented Dec. 14, 1920.
2 SHEETS—SHEET 2.
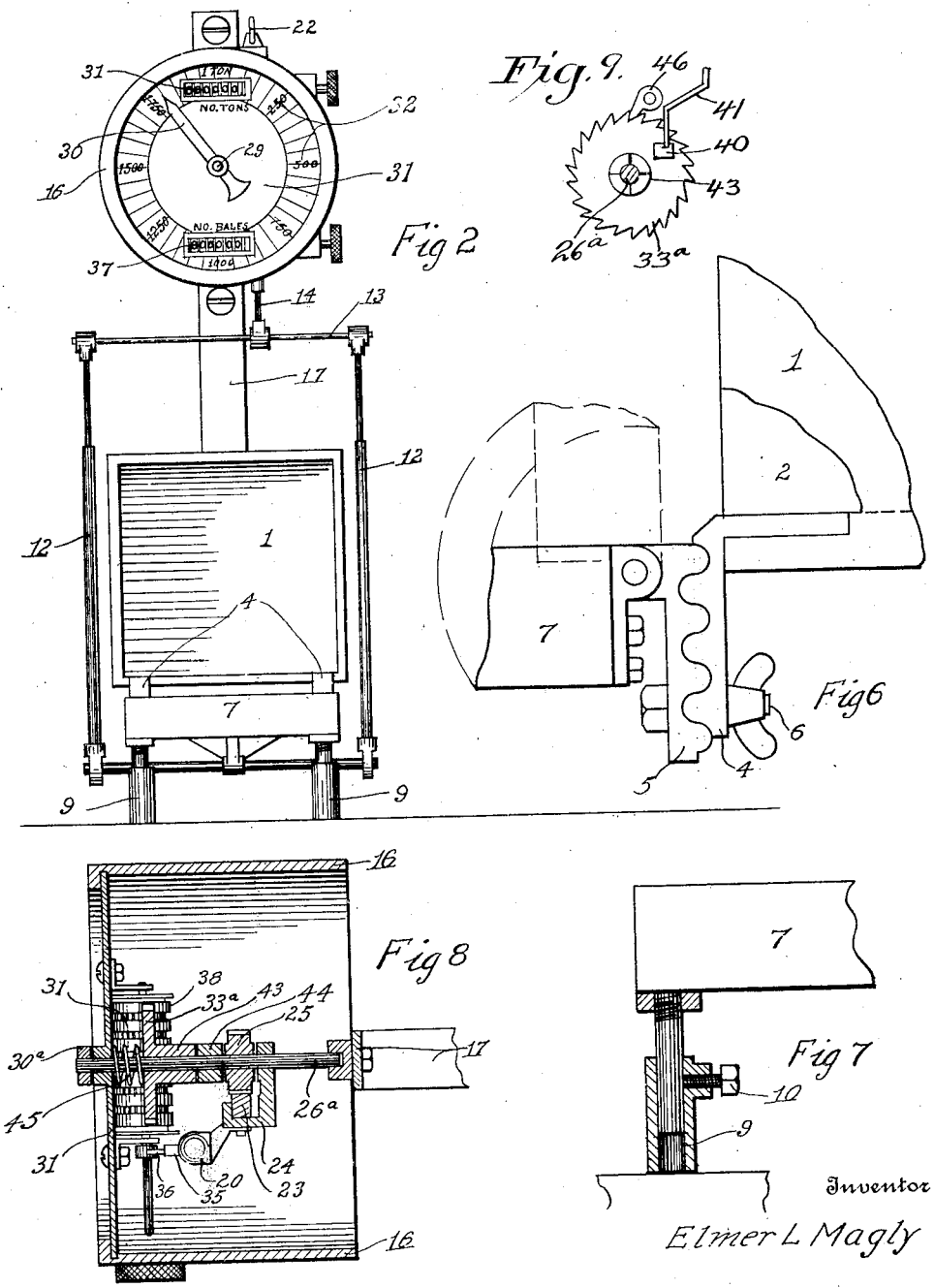
Inventor
Elmer L Magly
By C. C. Shepherd
Attorney

UNITED STATES PATENT OFFICE.

ELMER L. MAGLY, OF BALTIMORE, OHIO.

SCALE ATTACHMENT FOR HAY-PRESSES.

1,362,333.   Specification of Letters Patent.   Patented Dec. 14, 1920.

Application filed May 8, 1919. Serial No. 295,548.

*To all whom it may concern:*

Be it known that ELMER L. MAGLY, a citizen of the United States, residing at Baltimore, in the county of Fairfield and State of Ohio, has invented certain new and useful Improvements in Scale Attachments for Hay-Presses, of which the following is a specification.

This invention relates broadly to registering mechanism, and with regard to its more specific features, has particular reference to an improved combined scale and registering mechanism adapted for use in combination with hay presses or balers, the primary object of the invention being to provide a hay press with an improved scale mechanism wherein correlated means are provided for registering the number of bales ejected from the press, the weight of each bale and the tonnage of the aggregate number of bales handled by the scale mechanism.

Other objects will be in part obvious and in part pointed out hereinafter.

The invention accordingly consists in the novel features of construction, combination of elements and arrangement of parts, hereinafter to be more fully described and to have the scope thereof pointed out in the appended claims.

In the accompanying drawings:

Figure 1 is a side elevation of the discharge end of a hay press, and illustrating the application of the present invention thereto.

Fig. 2 is an end elevation.

Fig. 3 is a transverse horizontal sectional view taken along the line 3—3 of Fig. 1.

Fig. 4 is a vertical transverse section taken along the line 4—4 of Fig. 1.

Fig. 5 is a similar view taken along the line 5—5 of Fig. 1.

Fig. 6 is a detailed view illustrating the means for pivotally connecting the scale platform with the hay press.

Fig. 7 is a detailed section showing the adjustable leg construction of the scale platform.

Fig. 8 is a horizontal section disclosing a slightly modified form of the present invention, and Fig. 9 is a detail view disclosing the pawl employed in the form of the invention set forth in Fig. 8.

Similar characters of reference denote like and corresponding parts throughout the several views of the drawings.

Referring more particularly to the details of the invention, as they have been exemplified in the drawings, the numeral 1 designates the discharge end of a hay press, the latter may be of any standard construction and it is therefore not deemed necessary to illustrate the same in its entirety or to enter into a detailed description as to its operation or construction, as it will be understood, as the description proceeds, that the invention is applicable to hay presses or other equivalent devices of many widely different structural forms. As shown, however, the hay press in this instance is formed to include the usual baling chamber 2 and may also comprise depending traction wheels 3 for rendering the press portable.

Secured in any suitable manner to the end 1 of said press are a plurality of corrugated brackets 4 with which are associated similar brackets 5, the brackets 5 being adjustable vertically with respect to the brackets 4 and may be maintained in their adjusted positions through the agency of bolt structures 6. Pivoted to the brackets 5 is the rear end of a scale platform 7. This member 7 may be of any desired or standard construction and is adapted when not in use to assume a vertical position immediately to the rear of the chamber 2, as has been designated by dotted lines in Fig. 6. However, when in service, said platform 7 is adapted to assume a position in parallelism with the bottom of the hay press, so that the baled material discharged from said press may be readily deposited upon said platform. It has been found preferable to locate the upper surface of said platform slightly beneath the bottom of the chamber 2. This is done by locating the platform 7 slightly beneath the chamber 2, unformed bales projecting from said chamber will not contact with the platform 7 in such manner as to interfere with the accurate operation of the scale mechanism associated with said platform. To level the platform 7 when the latter is in a horizontal position, use is made of one or more adjustable leg members 9. Said members, in this instance, consist of a pair of telescoping sections which are adjustable longitudinally, and adjustment being maintained between said sections through the use of a set screw 10. By use of this construction, parallelism may be maintained between the platform 7 and the baling chamber 2.

Connected with the platform 7 is the usual beam 11, which is capable of being depressed when material is deposited upon the platform. One end of the beam 11 is connected with an adjustable vertically disposed rectangular frame 12, which is adapted to surround the discharge end 1 of the hay press, as is clearly shown in Fig. 2. Thus upon the depression of the platform 7, similar movement will be imparted to the frame 12. By rendering the various sections of the latter adjustable, said frame is capable of being adapted to hay presses of varying proportions. Connected with the upper cross rod 13 of the frame 12 is a vertically extending rod 14 which protrudes upwardly through an opening 15 provided within a scale casing 16, the latter being supported in any suitable manner and in this instance, the same has been shown as mounted upon the hay press through the agency of a supporting frame 17. The upper end of a rod 14 may be provided with an eye 18, to which is adapted to be secured the lower end of a coil spring 20. The upper end of said spring being connected with an adjustable bolt 21, which is preferably adjustably connected with the casing 16 through the medium of a nut 22, by adjusting said nut, the tension on the spring 20 may be varied so that the frame 12 may be balanced in unison with the platform 7 to render the action of the device accurate.

In order to register the weight of each bale placed upon said platform, the upper end of the rod 14 is suitably connected with the lower end of a rack member 23, so that the movement of the frame 12 will be also imparted to the rack member. The latter is mounted within a bracket 24 carried by the casing 16, so that the vertical movements of said rack member may take place in a guided and well supported manner. Meshing with the teeth of the member 23 is a pinion 25, which is fixedly mounted upon a shaft 26 located axially within the casing and mounted for rotation within the bracket 24. Also rotatable with the shaft 26 is a fixed clutch member 27, which is disposed for coöperation with a similar member 28 slidably carried and keyed to a coöperating shaft 29, the latter being suitably supported for rotation in alinement with the first shaft 26. The outer end of this shaft 29 is equipped with an indicator hand 30 which is revoluble over a graduated dial 31 located upon the casing 16. The circumferential portion of the dial is in this instance graduated to denote the ton and pound fractions thereof. From this it will be seen that upon placing material upon the platform 7, the frame 12 will be depressed a distance proportionable to the weight of the material. This downward movement on part of the frame is transmitted to the shaft 26 through the instrumentality of the rack member 23 and the pinion 25, and the movement is further imparted to the shaft 29 by the coöperation of the clutch members, the rotation of the shaft 29 governing the extent of movement of the dial hand 30 over the dial 31, whereby the operator upon noting the extent of movement of said hand over the graduations 32 will be able to readily observe the weight of the material on the platform 7.

To prevent return movement on part of the hand 30 when the platform 7 is relieved of weight and upon the contraction of the spring 20, the shaft 29 to the rear of the dial 31 is provided with a fixed ratchet 33, the teeth of which being engaged by pivoted pawl 34 suitably mounted within the casing. It will thus be seen that when the rack member 23 moves upwardly under the influence exerted by the spring 20, the shaft 29 will be held against rotation by the slipping engagement existing between the clutch members 27 and 28, this slippage being assured by the engagement of the pawl 34 with the ratchet 33. It will thus be apparent that the operator can accurately determine the precise weight of each bale by merely subtracting the weight previously registered from the poundage finally registered.

In order to register the number of bales handled by the machine under given operations, the upper end of the rod 14 is formed with a fixed finger 35, which is disposed to engage with an actuating arm 36 formed on the registering mechanism 37. It will be apparent that upon the downward movement of the rod 14, the finger 35 will be caused to engage with the arm 36, thus actuating the mechanism 37 to record a unit. The arm 36 is of the usual spring type and will return to a normal position upon its release from engagement with the finger 35. The registering mechanism 37 may be also of any desirable type, and consists of the usual numeral bearings dials 38 and the coöperating gears 39, which coöperate in the usual manner to record additional units upon every operation of the arm 36.

To register the total tonnage of the bales handled by the platform, the ratchet 33 is provided with a fixed stud 40, which is arranged to engage with the actuating arm 41 of a tonnage registering mechanism 42. The mechanism 42 being substantially identical with the mechanism 37. It will be apparent that each complete cycle of rotation on part of the ratchet 33 will be accompanied by engagement of the bevel stud 40 with the arm 41, so that the latter will be oscillated outwardly and the mechanism 42 connected therewith thereby actuated to record the required unit.

As shown in Fig. 8, a structure is provided wherein the weight of each bale may be more easily determined, without employing mathematical calculations. In this structure, the shaft 26ª is extended and is provided with an indicator hand 30ª. It will thus be seen that the hand 30ª will rotate in unison with the shaft 26ª, and that the movement of the latter will be governed, as usual, through the medium of the rack member 23. In other words, the hand 30ª will normally maintain a zero position and will return to this position upon each successive operation of the platform 7. To enable this modified structure to register the total tonnage handled thereby, the shaft 26ª is provided with a ratchet 33ª, the latter being formed with a hub 43 upon the end of which a clutch face is provided. The clutch face being designed for coöperation with a similar face 44 formed upon a member rotatable with the shaft 26ª. A spring 45 is inserted between the dial and the ratchet 33ª so that the engagement of the clutch teeth of the latter with the face 44 will be maintained. This ratchet is designed for engagement with the usual pawl 46, so that the upward movement of the member 23 will not impart similar movement to the ratchet 33ª. The latter in this instance also carries the stud 40 which coöperates with the arm 41 to actuate the mechanism 42. The advantage of the modified form resides in its general simplicity and also in the fact that the dial 31 may be readily read.

From the foregoing description, taken in connection with the accompanying drawing, it will be apparent that mechanism of a simple yet efficient nature has been provided for carrying out the objects and aims of the invention. Through the use of the structure set forth, the operator of the press may readily note the output of the machine upon which the scale mechanism is mounted and in this manner the value of the bales discharged from the press may be accurately ascertained.

I claim:

1. In mechanism of the class described, the combination with the discharge end of a hay press, of a scale structure pivotally carried by the discharge end of said press, whereby the structure when in an inactive position may be moved in unison with said press, means for controlling the height of operation of said scale structure, and a registering mechanism coöperative with said structure for registering the output of said hay press.

2. In a scale for hay presses, in combination, a movable platform structure capable of being operatively positioned for pivotal movement contiguous to the discharge end of a hay press, a scale mechanism carried by said hay press and disposed above the discharge end of the latter, a frame linking said platform and scale mechanism for correlated operation, and an adjustable leg member depending from said platform and operable to maintain the latter in a true horizontal working position with respect to the discharge end of said press.

3. In a scale for hay presses, the combination with a hay press, of a bracket rigidly carried by the discharge end of said press, a second bracket frictionally connected for vertical adjustment with said first named bracket, a platform structure situated to receive the bales discharged from said press, a pivotal connection between said platform structure and said last named bracket, a weight registering mechanism, and an operating connection between said platform structure and said mechanism.

4. In a scale attachment for hay presses, a platform situated to receive bales discharged from a hay press, a bale registering mechanism, comprising a rigidly positioned casing, a rotatable weight indicator carried by said casing and positioned to be movable over a graduated surface, a connection operable upon the imposition of weight upon said platform to rotate said indicator a distance proportionate to the weight on the platform, a spring capable of retaining said connection in a normal position and to resist movement thereof, a clutch operative to permit said connection to rotate said indicator in but one direction, and means operated by the rotation of the indicator to effect the actuation at predetermined intervals of a tongue registering mechanism.

5. In a scale attachment for hay presses, a depressible platform situated to receive bales discharged from a hay press, a bale registering mechanism comprising a rigidly positioned casing, a rotatable weight indicator carried by said casing and positioned to operate over a graduated surface, a connection operable upon the imposition of weight upon said platform to rotate said indicator a distance proportionate to the weight on the platform, a spring capable of returning said connection and platform to normal positions upon the removal of weight from the platform, a clutch operative to permit said connection to rotate said indicator in but one direction, means operated at predetermined intervals by the rotation of the indicator to effect the actuation of a tongue registering mechanism, and means operating upon each complete movement of said connection to register the number of bales deposited upon said platform.

In testimony whereof I affix my signature.

ELMER L. MAGLY.